Feb. 18, 1964  M. BRUYERE  3,121,546
AIRCRAFT INCLUDING A PLURALITY OF POWER PLANTS
AND A PLURALITY OF ROTARY PROPELLERS
Filed Jan. 25, 1962
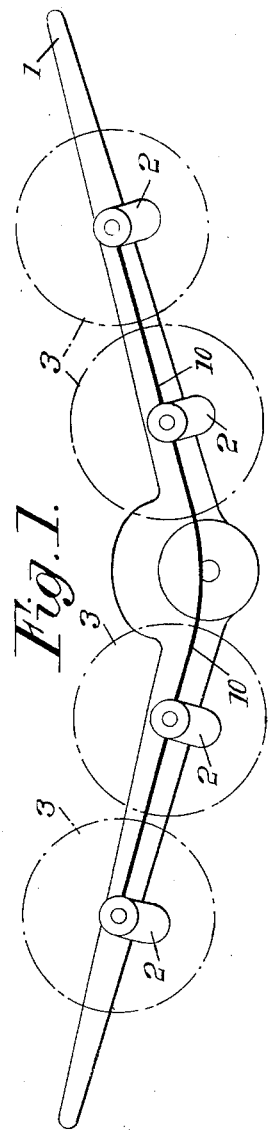
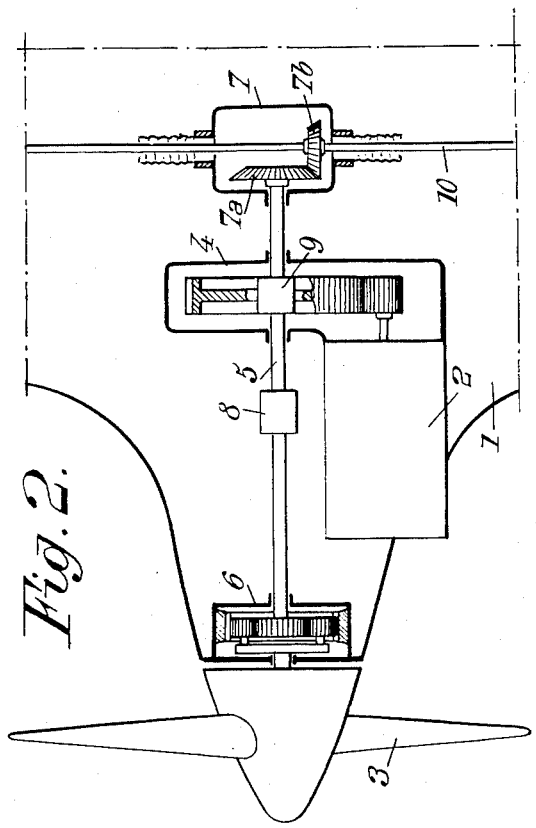

United States Patent Office 3,121,546
Patented Feb. 18, 1964

3,121,546
AIRCRAFT INCLUDING A PLURALITY OF POWER PLANTS AND A PLURALITY OF ROTARY PROPELLERS
Marcel Bruyere, Bois-Colombes (Seine), France, assignor to Societe d'Exploitation des Materiels Hispano-Suiza, Bois-Colombes (Seine), France, a society of France
Filed Jan. 25, 1962, Ser. No. 168,673
Claims priority, application France Feb. 1, 1961
7 Claims. (Cl. 244—55)

The present invention relates to aircraft including a plurality of power plants and a plurality of rotary propellers, these propellers generally consisting of airscrews driven by said power plants. The invention is more particularly concerned with the case where the number of power plants is equal to the number of propellers, each of said power plants serving to drive the corresponding propeller. Furthermore, the invention relates more particularly to the case where every unit constituted by a power plant and a propeller is a turbo-propeller.

The object of this invention is to provide an aircraft of this kind which is better adapted to meet the requirements of practice, especially concerning the reduction of weight and of dimensions of the elements.

With this object in view, according to my invention, I interconnect the rotary propellers of the aircraft by means of a flexible shaft individually coupled with the output shafts of the aircraft power plants through respective coupling devices and I make said coupling devices such that the speed of revolution of said flexible shaft is higher than that of said output shafts, the ratio of transmission of said coupling devices being preferably chosen such that the normal running speed of the flexible shaft is between two critical speeds of revolution of said flexible shaft.

A preferred embodiment of my invention will be hereinafter described with reference to the accompanying drawings, given merely by way of example and in which:

FIG. 1 is a diagrammatic front view of an aircraft powered with four turbo-propellers, this aircraft being made according to the present invention;

FIG. 2 is a diagrammatic plan view of one of the turbo-propellers of this aircraft, this view showing the coupling device interposed between said turbo-propeller and the flexible shaft.

The airplane 1 shown by the drawings is provided with four turbo-propellers each of which comprises a turbo-motor 2 and a propeller 3 driven by said turbo-motor. Each of the turbo-motors 2 is of suitable conventional construction and comprises a speed reducing gear 4, the driven shaft 5 of which constitutes the output shaft of the turbo-motor.

The corresponding screw propeller 3 is connected to said output shaft 5 through a speed reducing gear 6 advantageously incorporated in the hub of said propeller. The whole of the above mentioned elements constitutes one of the turbo-propellers of the aircraft.

In order to avoid the drawbacks that would result from a possible breakdown of a turbo-propeller (either of the turbo-motor or the propeller thereof) the output shafts 5 of the turbo-motors are interconnected by a transmission system individually coupled with each of said output shafts 5 through respective coupling devices 7.

It should be noted that it must be possible, whenever an element undergoes a breakdown, to separate this element from the transmission system. For this purpose, it suffices for instance to insert, between speed reducing gears 4 and 6, a clutch 8 and to have each of the output shafts 5 driven from the corresponding turbo-motor through a free-wheel 9.

It should be remembered that in aircraft of the above mentioned type the coupling devices provided between the turbo-motor output shafts and the transmission system serving to interconnect said shafts were arranged in such manner that said transmission system ran at a speed at most equal to that of the output shafts, this limitation of the speed of the transmission system being intended to prevent vibrations from taking place at critical speed practically higher than the normal speed of the output shafts 5.

This arrangement involved serious drawbacks resulting from the important torques created in the transmission system due to its relatively low speed of rotation. Among these drawbacks may be cited the necessity of making the transmission system in the form of an assembly of shaft sections capable of withstanding high torques. These shaft sections, generally tubular, were heavy and cumbersome and require accessories (bearings, universal joints, flexible joints and so on) further increasing the weight and dimensions of the system.

According to the present invention these drawbacks are avoided as follows:

The coupling devices 7 interposed between every output shaft 5 and the interconnecting transmission system are chosen such that the speed of rotation of said transmission system is higher than that of the output shafts 5 and preferably sufficiently high to be comprised between two critical speeds of said transmission system.

Taking advantage of this rise of the speed of the transmission system (which corresponds, for a given transmitted power, to a lowering of the torque created in said transmission system) I constitute said system by a thin flexible shaft 10, preferably made of a single piece, such a construction being made possible by the fact that under the most unfavorable conditions (for instance breakdown of three of the four turbo-motors) the torques created in the transmission system are still relatively low.

In this way I considerably reduce the weight and the diameter of the interconnecting shaft of the transmission system.

Furthermore I may dispense with a great number, if not all, of the universal joints, flexible joints, and other accessories which were necessary in the prior systems. Such advantages are particularly interesting when, as shown by FIG. 1, the turbo-propellers are distributed along the leading edge of a thin wing in which the thin flexible shaft 10 can easily be housed, such a shaft withstanding, without undue stresses, the deformations of said wing in flight.

In particular, if this wing forms a dihedral, shaft 10 is capable of bending to conform to this dihedral angle and can thus be made to extend from one outer turbo-propeller to the other.

Advantageously, flexible shaft 10 is disposed at the rear of turbo-motors 2 and for this purpose the output shafts comprise rearward extensions, each of the speed increasing devices 7 being interposed between an output shaft rearward extension and said flexible shaft 10.

Coupling devices 7 are advantageously made as shown by FIG. 2, consisting of a pair of bevel pinions $7_a$ and $7_b$ fixed respectively to the rearward extension of output shafts 5 and to flexible shaft 10, the ratio of the numbers of teeth of these pinions being such as to permit the desired increased speed of shaft 10 with respect to the speed of shaft 5.

By way of example, the following numerical values are given for the characteristic speeds of the elements above mentioned.

The speed of screw 3 is fixed, for aerodynamic reasons, at values ranging from 1,000 to 1,500 r.p.m. That of the rotor of the turbo-motor is fixed, for mechanical and thermo-dynamic reasons, at values ranging from 15,000 to 30,000 r.p.m. The speed of the output shafts of the turbo-motors ranges from 5,000 to 7,000 r.p.m. and that of flexible shaft 10 ranges from 8,000 to 12,000 r.p.m.

In particular, in the case of a turbo-motor running at 26,000 r.p.m. and the output shaft of which runs at 6,000 r.p.m. whereas the speed of the screw-propeller is 1,200 r.p.m. the coupling device 7 is arranged so as to give flexible shaft 10 speed equal to 9,000 r.p.m.

In the above description it has been supposed that the number of power plants, consisting of turbo-motors, is equal to the number of propellers, but this is merely a possible construction according to this invention, and it has no limitative character. Of course, the power plants may be of another type, for instance, they may be reciprocating piston engines. On the other hand, the number of propellers might be different from that of power plants.

I might for instance use two turbo-motors to drive four propellers distributed along the span of the wing.

In a general manner, while I have, in the above description, disclosed what I deem to be a practical and efficient embodiment of my invention, it should be well understood that I do not wish to be limited thereto as there might be changes made in the arrangement, disposition and form of the parts without departing from the principle of the present invention as comprehended within the scope of the accompanying claims.

What I claim is:

1. In an aircraft, the combination of a wing having a longitudinal plane of symmetry; at least two power plants mounted on said wing on opposite sides of said plane of symmetry, respectively, each of said power plants having an output shaft; at least two rotary propellers carried by said wing on opposite sides of said plane of symmetry, respectively, said propellers being operatively connected with said output shafts, respectively; a flexible rotatable shaft made of a single piece extending in said wing transversely to said longitudinal plane of symmetry; and coupling devices between each of said output shafts and said flexible shaft, said coupling devices being of the speed increasing type so that said flexible transverse shaft rotates at a speed higher than that of each of said output shafts.

2. An aircraft combination according to claim 1 where said wing is a thin wing with a dihedral, said flexible shaft being housed in the leading edge of said wing so as to be bent in conformity with said dihedral.

3. In an aircraft having a longitudinal plane of symmetry, the combination comprising: a wing extending on both sides of the plane of symmetry and symmetrical thereto; at least two power plants mounted on said wing, each power plant being on a side of the plane of symmetry opposite the other power plant; at least two rotary propellers carried by said wing on opposite sides, respectively, of the plane of symmetry; a rotatable output shaft operatively connecting one of the power plants to the corresponding propeller on the same side of the plane of symmetry; a second rotatable output shaft operatively connecting the other power plant to the corresponding propeller on its side of the plane of symmetry; a flexible, rotatable shaft made of a single piece extending within said wing on both sides of and transversely to the plane of symmetry; and coupling devices between each of the output shafts and the flexible shaft for transmitting rotary motion, the coupling devices including speed increasing means for rotation of the flexible shaft at a speed higher than the rotational speed of each of the output shafts.

4. The combination according to claim 3 wherein each power plant includes a rotor and further comprising first reduction gearing in the operative connection between each of the power plants and the respective output shaft for rotation of the output shaft at a speed lower than the operating speed of the rotor of the power plant; and second reduction gearing in the operative connection between each output shaft and the respective propeller for transmission of rotation from the output shaft to the propeller at a speed lower than the rotational speed of the output shaft.

5. The combination according to claim 4 wherein each of the output shafts is connected at one end to the respective coupling device and at the other end to the second reduction gearing, the first reduction gearing being operatively connected to the output shaft intermediate the ends thereof.

6. The combination according to claim 4 wherein the speed of each power plant rotor ranges from 15,000 to 30,000 r.p.m., the speed of each output shaft ranges from 5,000 to 7,000 r.p.m., the speed of each propeller ranges from 1,000 to 1,500 r.p.m., and the speed of the flexible shaft ranges from 8,000 to 12,000 r.p.m.

7. The combination according to claim 3 wherein the speed increasing means includes bevel gearing maintaining the flexible shaft at speed in the range of 8,000 to 12,000 r.p.m. for speeds of each output shaft in the range of 5,000 to 7,000 r.pm.

References Cited in the file of this patent

UNITED STATES PATENTS

| 2,178,725 | Lawrence | Nov. 7, 1939 |

FOREIGN PATENTS

| 20,785 | Great Britain | June 24, 1909 |
| 345,910 | Great Britain | Apr. 2, 1961 |